(12) United States Patent (10) Patent No.: US 12,056,768 B2
Li et al. (45) Date of Patent: Aug. 6, 2024

(54) ACCOUNT MANAGEMENT METHOD AND RELATED PRODUCT

(71) Applicant: SHENZHEN FUTU NETWORK TECHNOLOGY CO., LTD, Guangdong (CN)

(72) Inventors: Hua Li, Guangdong (CN); Changyou Su, Guangdong (CN)

(73) Assignee: Shenzhen Futu Network Technology Co., Ltd, Shenzhen (CN)

( * ) Notice: Subject to any disclaimer, the term of this patent is extended or adjusted under 35 U.S.C. 154(b) by 40 days.

(21) Appl. No.: 17/696,873

(22) Filed: Mar. 17, 2022

(65) Prior Publication Data

US 2022/0207612 A1 Jun. 30, 2022

Related U.S. Application Data

(63) Continuation of application No. PCT/CN2021/118767, filed on Sep. 16, 2021.

(30) Foreign Application Priority Data

Nov. 27, 2020 (CN) .......................... 202011367139.1

(51) Int. Cl.
*G06Q 40/04* (2012.01)
*G06F 16/2455* (2019.01)
*G06Q 40/12* (2023.01)
(52) U.S. Cl.
CPC ......... *G06Q 40/04* (2013.01); *G06F 16/2455* (2019.01); *G06Q 40/12* (2013.12)
(58) Field of Classification Search
CPC ..... G06Q 40/04; G06Q 40/12; G06F 16/2455
See application file for complete search history.

(56) References Cited

U.S. PATENT DOCUMENTS 10,956,986 B1 * 3/2021 Ran .................. G06Q 40/12
10,997,592 B1 * 5/2021 Kurani .............. G06Q 20/3821
(Continued)

FOREIGN PATENT DOCUMENTS

CN 101030311 A 9/2007
CN 105701239 A 6/2016
(Continued)

OTHER PUBLICATIONS

"Measuring Activity Level and Online Time." https://web.archive.org/web/20200930035651/https://tmetric.com/help/productivity-tracking/measuring-activity-level-and-online-time; Sep. 30, 2020 (Year: 2020).*

(Continued)

*Primary Examiner* — Elda G Milef

(57) ABSTRACT

The present disclosure relates to an account management method and a related product. The method includes: receiving, by the server, a business instruction transmitted by a client, wherein the business instruction carries an identification identifier; determining, by the server, a set of account identifiers associated with the identification identifier based on an identification and account association table, wherein the set of account identifiers includes at least two different account identifiers; performing, by the server, a business operation corresponding to the business instruction on accounts in the set of account identifiers to obtain a business operation result; and returning, by the server, the business operation result to the client.

18 Claims, 8 Drawing Sheets

(56) References Cited

U.S. PATENT DOCUMENTS

2014/0032399 A1    1/2014  Gonthier et al.
2020/0118137 A1    4/2020  Sood et al.

FOREIGN PATENT DOCUMENTS

| CN | 107067258 | A | * | 8/2017 | ............ G06Q 20/10 |
| CN | 108399538 | A | | 8/2018 | |
| CN | 108632367 | A | | 10/2018 | |
| CN | 108830731 | A | | 11/2018 | |
| CN | 110187945 | A | | 8/2019 | |
| CN | 110825957 | A | | 2/2020 | |
| CN | 110942393 | A | | 3/2020 | |
| CN | 111767455 | A | | 10/2020 | |
| CN | 112464204 | A | | 3/2021 | |
| WO | 2012091811 | A1 | | 7/2012 | |

OTHER PUBLICATIONS

The First Office Action in counterpart China Application No. 202011367139.1, dated Mar. 1, 2023.
Examination report for Australian patent application No. 2021385955, dated Mar. 9, 2023.
International Search Report in International Application No. PCT/CN2021/118767, dated Dec. 16, 2021.
The Second Office Action in counterpart China Application No. 202011367139.1, dated Jun. 20, 2023.
Rejection Decision in counterpart China Application No. 202011367139.1, dated Aug. 25, 2023.
Examination report No. 2 for Australian patent application No. 2021385955, dated Jan. 15, 2024.
Examination report No. 3 for Australian patent application No. 2021385955, dated Feb. 27, 2024.

* cited by examiner

ACCOUNT MANAGEMENT METHOD AND RELATED PRODUCT

The present application is a continuation of International Application NO. PCT/CN2021/118767, filed on Sep. 16, 2021, which claims a priority to Chinese Patent Application No. 202011367139.1, titled "ACCOUNT MANAGEMENT METHOD AND RELATED PRODUCT", and filed on Nov. 27, 2020, the entire disclosure of which are incorporated herein by reference.

TECHNICAL FIELD

The present disclosure relates to the field of account management technologies, and more particularly, to an account management method and a related product.

BACKGROUND

Many securities companies operate multiple securities businesses such as stocks, bonds, funds, and warrants at the same time. Suppose that a user opens several securities business accounts in one securities company, when the user logs in to software for business operations, a securities account management method is that: login and management of each securities business account are independent of each other, an independent account Identity Document (ID) is allocated to the user for each securities business, and the user uses the account ID to log in to a business system corresponding to the account ID to manage a corresponding business.

In a conventional securities account management method, each account is managed independently, and management of multiple accounts requires the user to log in to individual accounts to complete corresponding operations, which is cumbersome.

SUMMARY

In view of the above defects in the related art, an object of the present disclosure is to provide a securities account management method and a related product, aiming at solving a problem of low management efficiency of the conventional securities account management method.

In a first aspect of embodiments of the present disclosure, an account management method is provided. The method is applied in a server. The method includes: receiving, by the server, a business instruction transmitted by a client, wherein the business instruction carries an identification identifier; determining, by the server, a set of account identifiers associated with the identification identifier based on an identification and account association table, wherein the set of account identifiers includes at least two different account identifiers; performing, by the server, a business operation corresponding to the business instruction on an account in the set of account identifiers to obtain a business operation result; and returning, by the server, the business operation result to the client.

In the embodiments of the present disclosure, since multiple accounts of a user are associated with one securities identification, operations can be performed on the multiple accounts without logging in to each account separately, such that operations are convenient, and operation time is shortened, thereby improving management efficiency of the multiple accounts.

In a possible implementation, a type of the business instruction includes a type of intra-identification transfer, the business instruction further carries a payment account identifier, a recipient account identifier, and a transfer amount, and the payment account identifier and the recipient account identifier are any two different account identifiers in the set of account identifiers; and said performing, by the server, the business operation corresponding to the business instruction on the accounts in the set of account identifiers to obtain the business operation result includes: determining, by the server, whether a transferable amount of a payment account corresponding to the payment account identifier is smaller than the transfer amount; performing, by the server, a transfer operation to obtain transfer completion information, when the transferable amount is equal to or greater than the transfer amount; and obtaining, by the server, transfer failure information, when the transferable amount is smaller than the transfer amount.

In the embodiments of the present disclosure, funds can be directly transferred between accounts associated with the identification, without transferring funds through a bank, such that operations are convenient, and the management efficiency of accounts is improved.

In a possible implementation, a type of the business instruction includes a query type, and the business instruction further carries a screening condition; and said performing, by the server, the business operation corresponding to the business instruction on the account in the set of account identifiers to obtain the business operation result includes determining, by the server, a target account identifier that meets the screening condition from the set of account identifiers.

In the embodiments of the present disclosure, the server determines an account identifier of an account to be queried by the user based on the identification identifier and the screening condition carried in the business instruction, and returns the obtained account identifier to the client for the client to display the account identifier that meets the screening condition. When the user performs a query operation, only the account identifier that meets a query condition is displayed, such that user experience can be improved.

In a possible implementation, the screening condition includes a target business type, a target currency, and a target fund type; and said determining, by the server, the target account identifier that meets the screening condition from the set of account identifiers includes determining, by the server, the target account identifier that supports the target business type, the target currency, and the target fund type from the set of account identifiers.

In the embodiments of the present disclosure, an account attribute can be used as the screening condition to query a specific business type, a currency type, or a fund type, thereby improving the management efficiency of accounts.

In a possible implementation, the business operation result includes the target account identifier and an attribute of an account corresponding to the target account identifier.

In the embodiments of the present disclosure, when the type of the business instruction is the query type, a business result obtained when the server performs the business operation corresponding to the business instruction includes the target account identifier and the attribute of the account corresponding to the target account identifier, such that the client can display the target account identifier and the attribute of the account corresponding to the target account identifier, the user can know relevant information of the target account that meets the screening condition, and the user experience can be improved.

In a possible implementation, the method further includes, subsequent to said receiving, by the server, the business instruction transmitted by the client: predicting, by the server, at least one expected business operation based on a set of historically-received business instructions; determining, by the server, whether the at least one expected business operation includes a target expected business operation having an expected value greater than a threshold; and pushing, by the server to the client, an expected account identifier corresponding to the target expected business operation and an attribute of an account corresponding to the expected account identifier, when the at least one expected business operation includes the target expected business operation having the expected value greater than the threshold.

In the embodiments of the present disclosure, pushing of the account identifier and the account attribute of an expected account that the user may operate to the user based on a historical operation record of the user reduces time for the user to query the expected account, promotes the management efficiency of accounts, and improves the user experience.

In a possible implementation, said predicting, by the server, the at least one expected business operation based on the set of historically-received business instructions includes inputting, by the server, a business instruction parameter in the set of historically-received business instructions into a trained neural network prediction model to obtain at least one expected business operation and an expected value corresponding to the at least one expected business operation, wherein the business instruction parameter includes a type of the business instruction, reception time of the business instruction, and context information of the business instruction.

In the embodiments of the present disclosure, a neural network prediction model can accurately predict the expected account to be operated by the user, and push the account identifier and the account attribute of the expected account to the user, thereby promoting the management efficiency of accounts and improving the user experience.

In a second aspect of the embodiments of the present disclosure, an account management method is provided. The method is applied in a client. The method includes: generating, by the client in response to a business operation performed by a user for an identification, a business instruction, wherein the business operation carries an identification identifier; transmitting, by the client, the business instruction to a server; receiving, by the client, an operation result transmitted by the server, wherein the operation result is obtained by the server performing the business operation corresponding to the business instruction on an account in a set of account identifiers that are associated with the identification identifier; and displaying, by the client, the operation result.

In the embodiments of the present disclosure, since multiple accounts of the user are associated with one securities account, the user only needs to log in to one identification to manage the multiple accounts, such that operations are convenient, and operation time is shortened, thereby improving the management efficiency of the multiple accounts.

In a possible implementation, the business operation includes an intra-identification transfer operation, and said generating, by the client in response to the business operation performed by the user for the identification, the business instruction includes: responding, by the client, an intra-identification transfer request from the user for the identification; and receiving, by the client, a payment account identifier, a recipient account identifier, and a transfer amount that are selected by the user to generate a transfer instruction, wherein the transfer instruction carries the identification identifier, the payment account identifier, the recipient account identifier, and the transfer amount, and the payment account identifier and the recipient account identifier are any two different account identifiers in the set of account identifiers.

In the embodiments of the present disclosure, when the business operation includes the intra-identification transfer operation, the business instruction generated by the client carries the payment account identifier, the recipient account identifier, and the transfer amount, such that the server can perform a transfer operation corresponding to the business instruction.

In a possible implementation, the business operation includes a query operation, and the method further includes: generating, by the client in response to a query request from the user for the identification, a query instruction, wherein the query instruction carries a screening condition and the identification identifier of the identification; transmitting, by the client, the query instruction to the server; receiving, by the client, a query result returned by the server, wherein the query result includes a target account identifier that meets the screening condition in the set of account identifiers and information of an account corresponding to the target account identifier; and displaying, by the client, the target account identifier and information of a target account corresponding to the target account identifier.

In the embodiments of the present disclosure, the server determines the account identifier of the account to be queried by the user based on the identification identifier and the screening condition carried in the business instruction, and returns the obtained account identifier to the client for the client to display the account identifier that meets the screening condition. When the user performs the query operation, only the account identifier that meets the query condition is displayed, such that the user experience can be improved.

In a possible implementation, the method further includes, prior to said generating, by the client in response to the business operation performed by the user for the identification, the business instruction: determining, by the client, whether the set of account identifiers includes at least one non-empty account; determining, by the client, a corresponding opening place based on current time, and determining, by the client, a displayable account that supports the opening place in the at least one non-empty account, when the set of account identifiers includes the at least one non-empty account; and displaying, by the client, the displayable account.

In the embodiments of the present disclosure, the client displays a tradable account whose balance is not zero at current time, such that the user does not need to manually search for tradable accounts when conducting a transaction, which saves the operation time for the user and improves the user experience.

In a third aspect of the embodiments of the present disclosure, an account management apparatus is provided. The apparatus includes: a first receiving unit configured to receive a business instruction transmitted by a client, wherein the business instruction carries an identification identifier; a determining unit configured to determine a set of account identifiers associated with the identification identifier based on an identification and account association table, wherein the set of account identifiers includes at least two different account identifiers; a processing unit configured to perform a business operation corresponding to the business instruction on an account in the set of account identifiers to obtain a business operation result; and a first transmitting unit configured to return the business operation result to the client.

In a fourth aspect of the embodiments of the present disclosure, an account management apparatus is provided. The apparatus includes: a generation unit configured to generate, in response to a business operation performed by a user for an identification, a business instruction, wherein the business operation carries an identification identifier; a second transmitting unit configured to transmit the business instruction to a server; a second receiving unit configured to receive an operation result transmitted by the server, wherein the operation result is obtained by the server performing the business operation corresponding to the business instruction on an account in a set of account identifiers that are associated with the identification identifier; and a display unit configured to display the operation result.

In a fifth aspect of the embodiments of the present disclosure, a server is provided. The server includes a processor and a memory. The memory has one or more programs stored thereon, and the one or more programs are configured to be executed by the processor to perform part or all of the steps described in the first aspect of the embodiments of the present disclosure.

In a sixth aspect of the embodiments of the present disclosure, a terminal device is provided. The terminal device includes a processor and a memory. The memory has one or more programs stored thereon, and the one or more programs are configured to be executed by the processor to perform part or all of the steps described in the second aspect of the embodiments of the present disclosure.

In a seventh aspect of the embodiments of the present disclosure, a computer-readable storage medium is provided. The computer-readable storage medium stores a computer program. The computer program includes program instructions, and the program instructions, when executed by a processor, cause the processor to perform part or all of the steps described in the first aspect of the embodiments of the present disclosure.

In an eighth aspect of the embodiments of the present disclosure, a computer-readable storage medium is provided. The computer-readable storage medium stores a computer program. The computer program includes program instructions, and the program instructions, when executed by a processor, cause the processor to perform part or all of the steps described in the second aspect of the embodiments of the present disclosure.

In the embodiments of the present disclosure, since multiple accounts of the user are associated with one securities identification, operations can be performed on the multiple accounts without logging in to each account separately, such that operations are convenient, and operation time is shortened, thereby improving management efficiency of the multiple accounts.

DESCRIPTION OF EMBODIMENTS

In order to facilitate the understanding of the present disclosure, the present disclosure will be described in a more comprehensive manner with reference to relevant accompanying drawings. Preferred implementations of the present disclosure are illustrated in the accompanying drawings. However, the present disclosure can be implemented in many different forms and is not limited to the implementations described herein. On the contrary, these implementations are provided to offer a more thorough and comprehensive understanding of the present disclosure. Unless otherwise defined, all technical and scientific terms used herein have the same meaning as commonly understood by those skilled in the technical field of the present disclosure. Terms used in the specification of the present disclosure are only for describing specific implementations, rather than limiting the present disclosure.

Many securities companies operate multiple securities businesses such as stocks, bonds, funds, and warrants at the same time. Suppose that a user opens several securities business accounts in one securities company, when the user logs in to software for business operations, a common solution adopted in the field currently is that: login and management of each securities business account are independent of each other, an independent account ID is allocated to the user for each securities business, and the user uses the account ID to log in to a business system corresponding to the account ID to manage a corresponding business.

Figure 1:
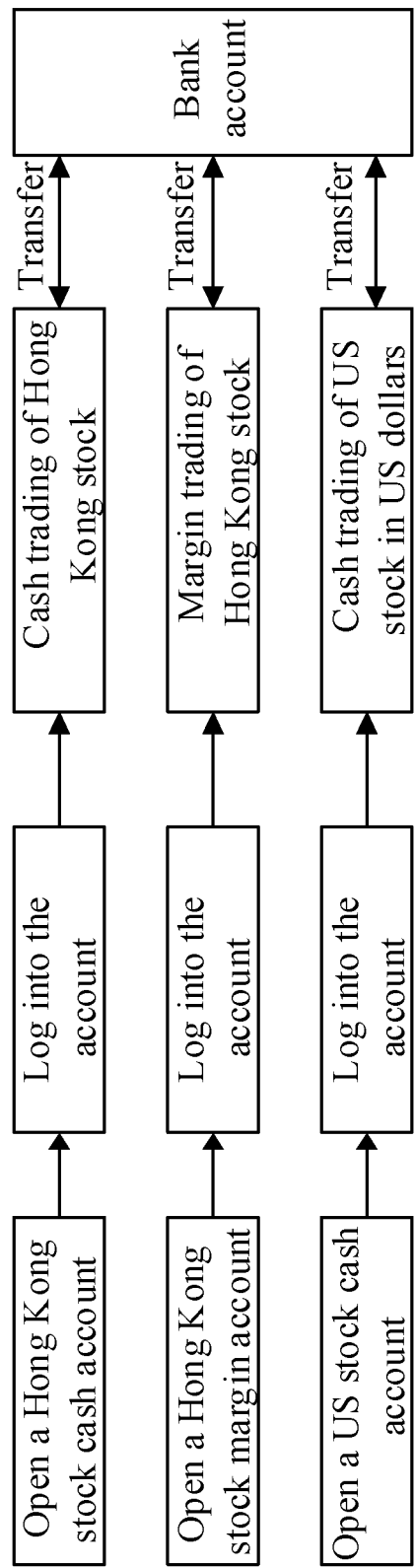
FIG. 1 is a schematic diagram showing a conventional securities account management method.

For example, the user opens three securities accounts in a securities company, i.e., a Hong Kong stock cash account, a Hong Kong stocks margin account, and a US stock cash account. Management operations corresponding to the three accounts include cash trading of Hong Kong stocks, margin trading of Hong Kong stocks, cash trading of US stocks in US dollars, fund transfers between multiple accounts, and the like. As illustrated in FIG. 1, in a conventional account management method, the user obtains three independent securities account IDs, and logs in each of the three account IDs to complete a corresponding operation. In addition, if funds need to be transferred between different accounts, funds can only be transferred through a bank separately, since securities accounts are independent of each other, after logging in to a securities account, the user cannot obtain information of securities accounts other than the securities account.

Technically, since securities business accounts are totally independent of each other, database tables of account information are also designed independently of each other, i.e., each business has one account table that records account information such as an account ID, a password, and a name. Such a method has poor scalability for a reason that to add a new business, construction of a business account needs to be repeatedly from an underlying database table structure.

In a conventional securities account management method, each account is managed independently, and management of multiple accounts requires the user to log in to each account to complete corresponding operations. Such a conventional method is inconvenient since the user needs to memorize multiple account IDs and login passwords, and requires cumbersome login and switching operations. In addition, it is difficult to synchronize and share many attributes of the user, e.g., accumulated online time of the user, between various accounts of the user.

On such a basis, the present disclosure aims to provide solutions that can solve the above technical problems. Details of the solutions will be described in subsequent embodiments.

Word definitions:

Account: an identifier for opening a certain securities business of a user. If the user has opened a Hong Kong stock cash service and a Hong Kong stocks margin service in a securities company, the user owns a Hong Kong stock cash account and a Hong Kong stocks margin account.

Identification: a unique identifier of the user, e.g., a mobile phone number, an email address, an identity card number, or other forms, which is often used to log in to a system.

Figure 2:
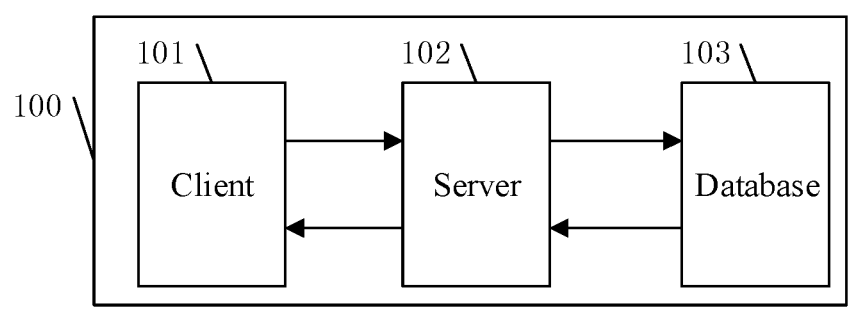
FIG. 2 is a diagram showing a system architecture according to an embodiment of the present disclosure.

FIG. 2 is a diagram showing a system architecture according to an embodiment of the present disclosure. As illustrated in FIG. 2, the system architecture includes a client 201, a server 202, and a database 203, which may be in a same terminal device or in different terminal devices. When the client 201, the server 202, and the database 203 are in different terminal devices, a communication connection can be established via a network.

The client 201 has a display interface. The client 201 generates, in response to a business operation performed by the user for an identification, a business instruction, in which the business instruction carries an identification identifier of the identification, and transmits the business instruction to the server 202.

The server 202 receives the business instruction transmitted by the client 201, accesses the database 203, determines a set of account identifiers associated with the identification identifier based on an identification and account association table in the database 203, and performs a business operation corresponding to the business instruction on an account in the set of account identifiers to obtain a business operation result. The server 202 returns the business operation result to the client 201.

The client 201 receives and displays the business operation result returned by the server.

Figure 3:
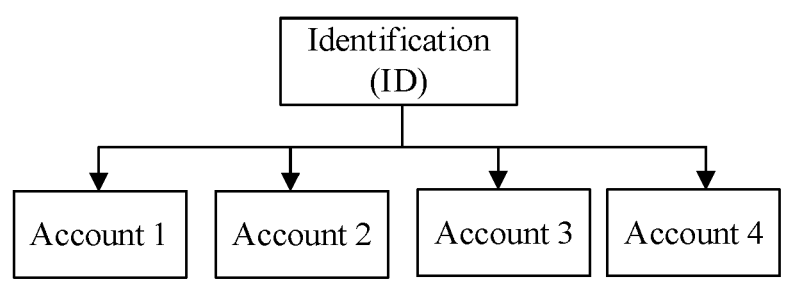
FIG. 3 is a schematic diagram showing an overall structure of an identification and accounts according to an embodiment of the present disclosure.

FIG. 3 is a schematic diagram showing an overall structure of an identification and accounts according to an embodiment of the present disclosure. As illustrated in FIG. 3, one identification can be associated with multiple accounts, and the multiple accounts can be managed at the same time by logging in to one account.

As a unique identifier of the user, the identification can be a mobile phone number, an email address, an identity card number, or other forms. Also, the mobile phone number, the email address, and the identity card number can be bound to each other, such that the user may select one of the mobile phone number, the email address, or the identity card number for login. In order to uniquely identify different accounts of different users, each account needs to be assigned a globally unique account identifier. For the sake of recognition and memorization, generally a set of digital identifiers with coding rules are used, such that information such as a securities business to which an account belongs can be recognized through the set of digital identifiers. By associating one identification with multiple accounts, information of the multiple accounts of the user can be obtained by logging in to only one identification, and also, various attributes of the user can be shared synchronously, e.g., accumulated online time of the user, points, etc. An association between an identification and accounts may be expressed as an association between an identification identifier and account identifiers.

Figure 4:
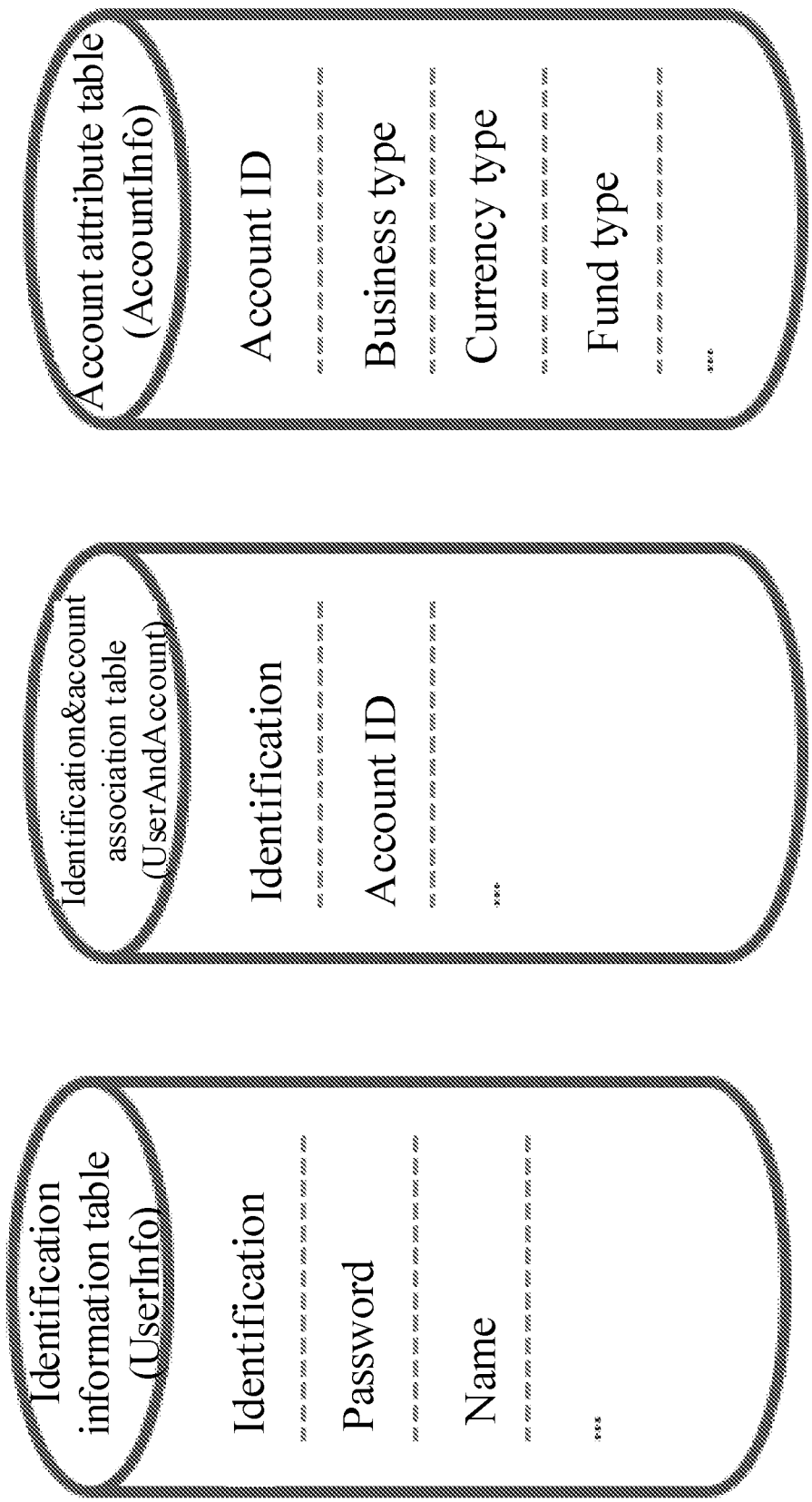
FIG. 4 is a schematic diagram showing a basic structure of a database table design for an identification and accounts according to an embodiment of the present disclosure.

FIG. 4 is a schematic diagram showing a basic structure of a database table design for an identification and accounts according to an embodiment of the present disclosure. As illustrated in FIG. 4, database tables of the above overall structure of the identification and the accounts include an identification information table (UserInfo), an identification and account association table (UserAndAccount), and an account attribute table (AccountInfo).

The identification information table has two main functions: one is to record the identification identifier and the password for logging in to a system, and the other is to record personal information of the user, e.g., name, age, and region. A row of data is recorded in the identification information table for each user, and the identification identifier in the identification information table is set as a primary key, such that the identification identifier can uniquely identify each row in the identification information table, and it is convenient for the user to delete or modify a record in the identification information table.

A main function of the identification and account association table is to record accounts with which the identification is associated, and each account association has a record in the table. Accounts associated with each identification can be obtained through the identification and account information table. If the user has opened multiple accounts, this table records multiple rows of data having a same identification but different account IDs. Since one "identification" corresponds to multiple pieces of data, e.g., multiple business securities accounts are opened under the same identification, a conflict may occur when the primary key is set, such that no primary key is set in the identification and account association table. An index is added to an identification field in the identification and account association table to quickly locate account identifiers associated with the identification through the identification identifier.

A main function of the account attribute table is to record attributes of an account, e.g., a business type, a currency type, a fund type, etc., so as to facilitate the screening of eligible accounts through the account attributes. A primary key of the account attribute table is the account identifier, i.e., each account of each user has a record in the account attribute table. Here, the business type can include stocks, bonds, funds, warrants, etc., the currency type can include RMB, Hong Kong dollars, U.S. dollars, euros, etc., and the fund type can include cash, margin, virtual capital, etc.

The overall structure of the identification and the account has high scalability. If a new business, e.g., a fund business, is developed in the future, the system only needs to add a new record to the "Account Attribute Table" and a new record to the identification and account association table, without making any structural adjustments.

For example, when an account 123@xx.com opens a "fund business", pseudo codes that need to be executed are as follows:

insert Into AccountInfo (account ID, business type, . . . ) Values (id, fund, . . . );
insert Into userAndAccount (identification, account ID, . . . ) Values (123@xx.com, id, . . . ).

Figure 5:
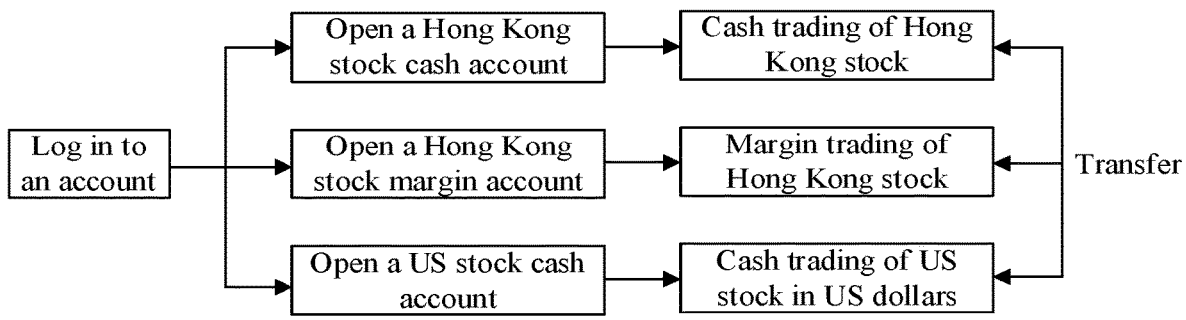
FIG. 5 is a schematic diagram showing an account management mode according to an embodiment of the present disclosure.

With continued reference to the previous example that the user opens three accounts in a securities company, i.e., the Hong Kong stock cash account, the Hong Kong stocks margin account, and the US stock cash account. The management operations corresponding to the three accounts include the cash trading of Hong Kong stocks, the margin trading of Hong Kong stocks, the cash trading of US stocks in US dollars, the fund transfers between multiple accounts, and the like. The above overall structure of the identification and the accounts is adopted to manage the accounts of the user, and a management method of the overall structure is as illustrated in FIG. 5. The user logs in to a registered identification and opens the Hong Kong stock cash account, the Hong Kong stocks margin account, and the US stock cash account, such that these accounts can be associated with the identification registered by the user. After the user opens the accounts, the user can perform corresponding management operations on the accounts, including the cash trading of Hong Kong stocks, the margin trading of Hong Kong stocks, the cash trading of US stocks in US dollars, the fund transfers between multiple accounts, and the like. In the above management method, funds in the current accounts opened by the user and associated with the identification registered by the user can be directly transferred to each other, without transferring through a bank.

In the embodiments of the present disclosure, after the user logs in to the identification, the system obtains information of all accounts associated with the identification that the user logs in, such that the user can operate multiple accounts at the same time. Operations can be performed on the multiple accounts by the user without logging in to each account separately, such that operations are convenient, and operation time is shortened, thereby improving management efficiency of the multiple accounts.

Figure 6:
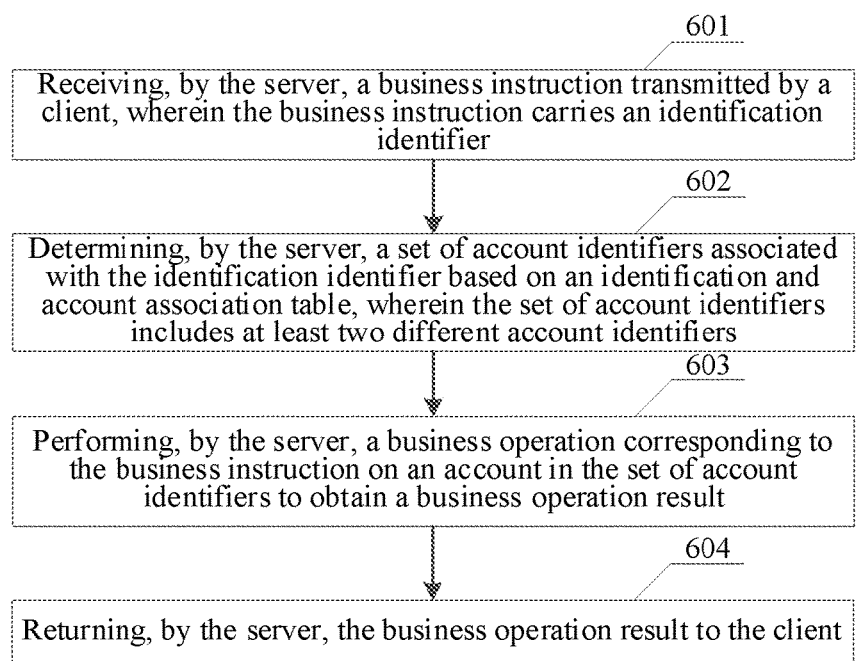
FIG. 6 is a schematic flowchart showing an account management method according to an embodiment of the present disclosure.

FIG. 6 is a schematic flowchart showing an account management method according to an embodiment of the present disclosure. As illustrated in FIG. 6, the account management method includes the following steps.

At step 601, the server receives a business instruction transmitted by a client, in which the business instruction carries an identification identifier.

The business instruction received by the server is generated by the client in response to a business operation performed by a user for an identification. The user can perform a corresponding business operation on the identification at the client, and the client generates the business instruction in response to the business operation performed by the user for the identification, in which the business instruction carries the identification identifier of the identification. The identification identifier is used to confirm an identity of the user and determine an identification on which the user performs the business operation.

At step 602, the server determines a set of account identifiers associated with the identification identifier based on an identification and account association table.

After receiving the business instruction transmitted by the client, the server recognizes the identification identifier carried in the business instruction and accesses a database. The identification identifier can be associated with multiple account identifiers, and the identification identifier and the account identifier each have a record in the identification and account association table in the database. The server determines the set of account identifiers associated with the identification identifier based on the identification and account association table in the database. The set of account identifiers is a set of all account identifiers that are associated with the identification identifier, including at least two different account identifiers.

For example, an identification identifier is associated with an account identifier 1, an account identifier 2, an account identifier 3, and an account identifier 4, and the identification identifier and the account identifier 1, the identification identifier and the account identifier 2, the identification identifier and the account identifier 3, and the identification identifier and the account identifier 4 each have a record in the identification and account association table in the database. The set of account identifiers associated with the identification identifier and determined by the server based on the identification and account association table in the database is a set of the account identifier 1, the account identifier 2, the account identifier 3, and the account identifier 4.

At step 603, the server performs a business operation corresponding to the business instruction on an account in the set of account identifiers to obtain a business operation result.

The server determines the set of account identifiers associated with the identification identifier, i.e., account identifiers associated with the identification identifier, based on the identification and account association table. The server determines, based on information carried in the business instruction, an account that requires the business operation from the set of account identifiers, performs the business operation corresponding to the business instruction on the account that requires the business operation, and obtains a corresponding business operation result after the operation is completed.

At step 604, the server returns the business operation result to the client.

The server returns the business operation result obtained after performing the business operation corresponding to the business instruction to the client. The client receives and displays the business operation result to feedback the user the business operation result performed by the user for the identification.

In the embodiments of the present disclosure, one identification can be associated with multiple accounts at the same time. Since the multiple accounts of the user are associated with one securities identification, operations can be performed on the multiple accounts without logging in to each account separately, such that operations are convenient, and operation time is shortened, thereby improving the management efficiency of the multiple accounts.

In a possible implementation, a type of the business instruction includes a type of intra-identification transfer, the business instruction further carries a payment account identifier, a recipient account identifier, and a transfer amount, and the payment account identifier and the recipient account identifier are any two different account identifiers in the set of account identifiers.

The performing, by the server, the business operation corresponding to the business instruction on the accounts in the set of account identifiers to obtain the business operation result includes: determining, by the server, whether a transferable amount of a payment account corresponding to the payment account identifier is smaller than the transfer amount; performing, by the server, a transfer operation to obtain transfer completion information, when the transferable amount is equal to or greater than the transfer amount; and obtaining, by the server, transfer failure information, when the transferable amount is smaller than the transfer amount.

When the business operation performed by the user for the identification on the client is the intra-identification transfer, in addition to the identification identifier, the business instruction generated by the client further carries the payment account identifier, the recipient account identifier, and the transfer amount. Here, the payment account identifier and the recipient account identifier are any two different account identifiers in the set of account identifiers. That is, both the payment account identifier and the recipient account identifier are associated with the above identification identifier.

The server determines whether the transferable amount of the payment account corresponding to the payment account identifier is smaller than the transfer amount before performing the transfer operation.

In a case that the transferable amount of the payment account corresponding to the payment account identifier is equal to or greater than the transfer amount, the server performs the transfer operation. The server subtracts the transfer amount from a balance of the payment account, and adds the transfer amount to a balance of the recipient account. When the server performs the transfer operation, an exchange rate conversion is required when currency types of the recipient account and the payment account are different. The transfer operation of the server can be implemented by using atomicity and consistency of the database. The atomicity of the database means that a transaction is an indivisible unit of work, and operations in the transaction are either fully completed or not performed at all. The consistency of the database means that an integrity constraint of the database is not destroyed before a start of the transaction and after an end of the transaction, which indicates that the transaction in the database cannot destroy integrity of relational data and logical consistency of businesses. That is, when the server performs the transfer operation, either all of or none of an operation of subtracting the transfer amount from the balance of the payment account and an operation of adding the transfer amount to the balance of the recipient account in the database occur concurrently. A total amount of the payment account and the recipient account remains unchanged, regardless of whether the transfer operation is completed or not, such that a normal execution of the transfer operation can be ensured.

For example, when the user needs to transfer 200 Hong Kong dollars from his/her "Hong Kong stock cash account" to his/her "Hong Kong stocks margin account", pseudo codes for the transfer operation are as follows:

```
Update AccountInfo set balance=
    case account ID
        when 'Hong Kong stock cash account ID' then balance -200
        when 'Hong Kong stock margin account ID' then balance +200
    end
where account ID in ('fund account ID','Hong Kong stock cash account').
```

After completing the transfer operation, the server obtains transfer completion information, and returns the transfer completion information to the client for the client to prompt the user that the transfer operation has been completed.

In a case that the transferable amount of the payment account corresponding to the payment account identifier is smaller than the transfer amount, the payment account cannot transfer funds to the recipient account, and the server obtains transfer failure information. The server returns the received transfer failure information to the client for the client to prompt the user that the payment account has an insufficient balance.

In the embodiments of the present disclosure, mutual transfers of funds between different accounts under the identification of the user can be performed without the bank, such that operations are convenient.

In a possible implementation, a type of the business instruction includes a query type, and the business instruction further carries a screening condition. The performing, by the server, the business operation corresponding to the business instruction on the account in the set of account identifiers to obtain the business operation result includes: determining, by the server, a target account identifier that meets the screening condition from the set of account identifiers.

When the user performs a query operation on the client, the business instruction generated by the client carries the identification identifier corresponding to the identification for which the user performs the query operation and a query condition. The server receives the business instruction transmitted by the client, accesses the database, and determines, based on the identification and account association table in the database, the set of account identifiers associated with the identification identifier carried in the business instruction, i.e., determines all the account identifiers associated with the identification identifier carried in the business instruction. Then, the server screens the set of account identifiers based on the screening condition carried in the business instruction to obtain the target account identifier that meets the screening condition from the set of account identifiers. The obtained target account identifier that meets the screening conditions is returned to the client for the client to display the target account identifier.

When the user needs to query all accounts associated with the identification, the screening condition is all account identifiers associated with the identification identifier. The server determines the set of account identifiers associated with the identification identifier based on the identification and account association table, in which the set of account identifiers meets the screening condition, and the target account identifier is the set of account identifiers. The server returns the set of account identifiers to the client, and the client displays the set of account identifiers.

For example, after the identification having the identification identifier 123@xx.com registered by the user has been successfully logged in, and all accounts associated with the identification are queried, the client generates, in response to the query operation of the server, the business instruction that carries the identification identifier 123@xx.com of the identification. After receiving the business instruction transmitted by the client, the server can query the identification information table and the identification and account association table using the identification identifier 123@xx.com, and determine all account identifiers associated with the identification identifier 123@xx.com. Pseudo codes executed are as follows:

```
select t1. identification, t1. account ID, t2.
  business type, t2. currency type, t2.
fund type, ...
  from
    (select * from UserAndAccount where account='123@xx.com') t1
  left join
    AccountInfo t2
  on t1. account ID = t2. account ID.
```

When the pseudo codes are executed, a record of the identification 123@xx.com is selected from the identification and account association table, and then a left join is performed between the account identifier in the account attribute table and a record having the same account identifier in the identification and account association table to obtain a result table including the identification identifier 123@xx.com, account identifiers, and account attributes. Each account has a record in the result table. The server returns the result table to the client, and the client displays all the account identifiers and account attributes associated with the identification having the identification identifier 123@xx.com.

In the embodiments of the present disclosure, the server determines an account identifier of an account to be queried by the user based on the identification identifier and the screening condition carried in the business instruction, and returns the obtained account identifier to the client for the client to display the account identifier that meets the screening condition. When the user performs the query operation, only the account identifier that meets the query condition is displayed, such that user experience can be improved.

In a possible implementation, the screening condition includes a target business type, a target currency, and a target fund type; and the determining, by the server, the target account identifier that meets the screening condition from the set of account identifiers includes: determining, by the server, the target account identifier that supports the target business type, the target currency, and the target fund type from the set of account identifiers.

When querying accounts associated with the identification, the user can query an account that supports a certain business type, currency type, and fund type, i.e., an attribute of the account is used as the screening condition. When the attribute of the account is used as the screening condition, the business instruction generated by the client carries the target business type, the target currency type, and the target fund type that are to be screened. After receiving the business instruction transmitted by the client, the server determines, based on the identification and account association table, the set of account identifiers associated with the identification identifier carried in the business instruction. When the set of account identifiers is screened, the target account identifier that supports the target business type, the target currency type, and the target fund type are screened out from the set of account identifiers. When screening the set of account identifiers, the server accesses the database to query the account attribute table in the database, and screens out an eligible target account identifier based on the attribute of the account.

For example, if the user wants to query the Hong Kong stock margin account, in the screening condition carried in the business instruction, the target business type is "stocks", the target currency type is "Hong Kong dollars", and the target fund type is "margin". The business instruction generated by the client carries the identification identifier of the identification corresponding to the user and the screening condition. After receiving the business instruction transmitted by the client, the server queries all account identifiers associated with the identification identifier carried in the business instruction and the attributes of the accounts corresponding to the account identifiers associated with the identification identifier, and obtains a result table. An account whose "business type" is "stocks", "currency type" is "Hong Kong dollars", and "funds type" is "margin" is screened out from the result table, and the account identifier and the account attribute of an eligible account are returned to the client for the client to display the target account identifier that meets the screening condition. The above result table is named UserAccounts, and pseudo codes for the server to determine the target account identifier that supports the target business type, the target currency, and the target fund type from the set of account identifiers are as follows:

select account ID, . . .
from UserAccounts where business type='stocks' and currency type='Hong Kong dollars' and fund type='margin'.

In the embodiments of the present disclosure, the attribute of the account can be used as the screening condition to query a specific business type, currency type, or fund type, thereby improving the management efficiency of accounts.

In a possible implementation, the business operation result includes the target account identifier and the attribute of the account corresponding to the target account identifier.

Figure 7:
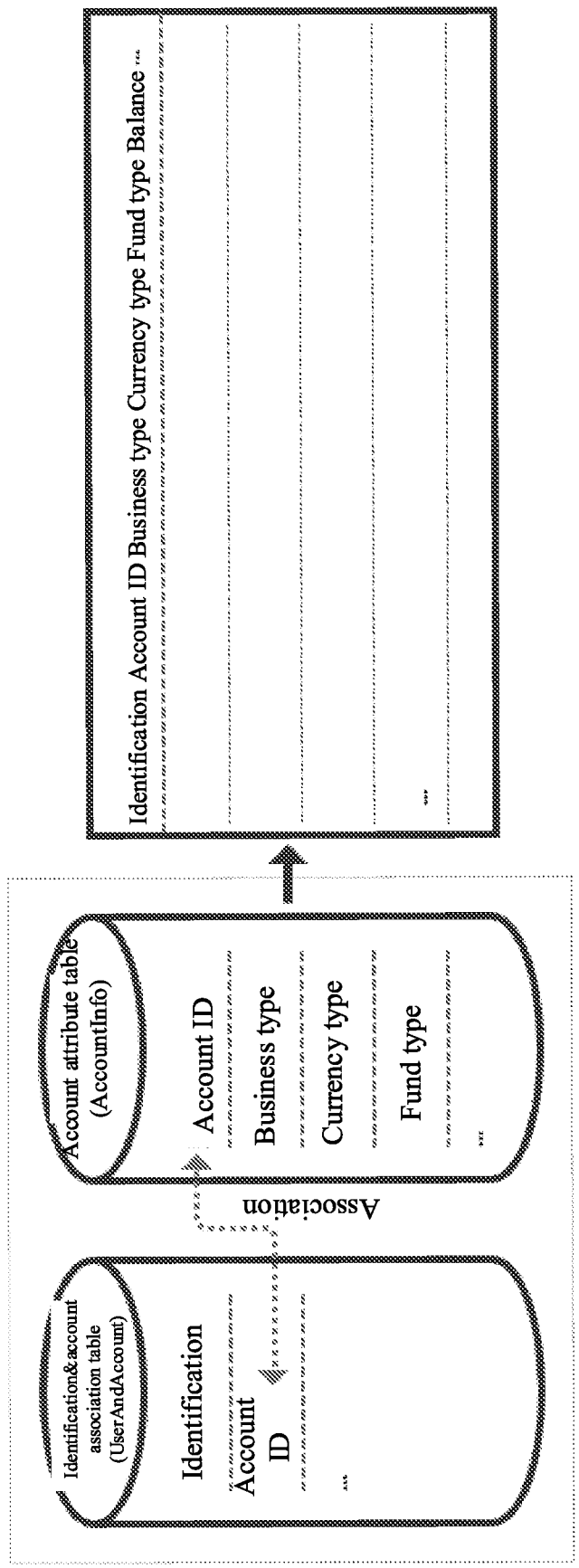
FIG. 7 is a schematic diagram showing an association method of database tables according to an embodiment of the present disclosure.

As illustrated in FIG. 7, when the type of the business instruction received by the server is the query type, the business operation result returned by the server to the client includes the target account identifier and the attribute of the account corresponding to the target account identifier. In the overall structure of the identification and the accounts, the identification information table can be associated with the identification and account association table through the identification identifier. The server obtains the set of account identifiers associated with the identification identifier by using an association relation between the identification and the accounts, queries a list of target account identifiers that meet the screening condition, queries the attribute of the target account corresponding to the target account identifier in the account attribute table by using the target account identifier, and returns the target account identifier and the queried attribute of a target account to the client. The client displays the target account identifier and the attribute of the target account.

In the embodiments of the present disclosure, when the type of the business instruction is the query type, the business result obtained when the server performs the business operation corresponding to the business instruction includes the target account identifier and the attribute of the account corresponding to the target account identifier, such that the client can display the target account identifier and the attribute of the account corresponding to the target account identifier, so the user can know relevant information of the target account that meets the screening condition, and the user experience can be improved.

Figure 8:
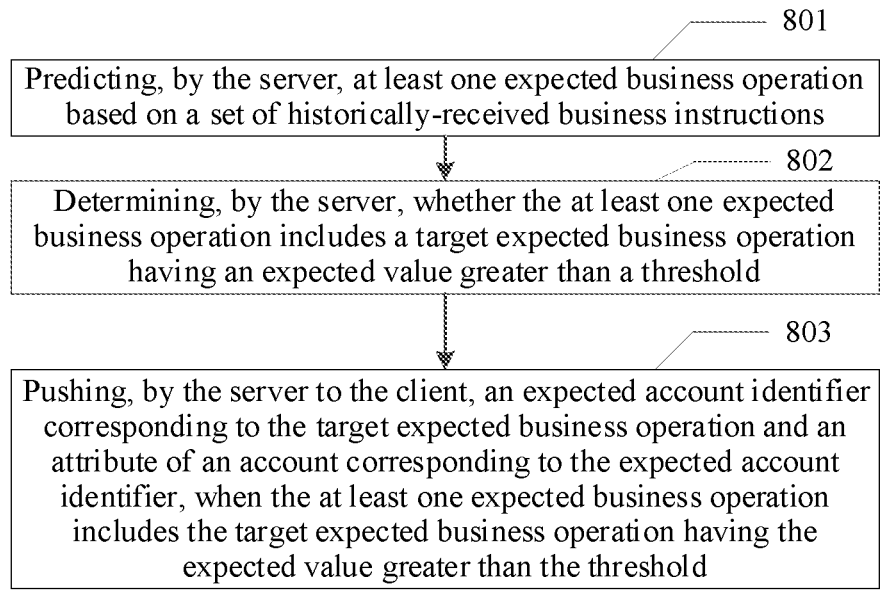
FIG. 8 is a schematic flowchart showing another account management method according to an embodiment of the present disclosure.

FIG. 8 is a schematic flowchart showing another account management method according to an embodiment of the present disclosure. As illustrated in FIG. 8, in a possible implementation, after the server receives the business instruction transmitted by the client, the account management method further includes the following steps.

At step 801, the server predicts at least one expected business operation based on a set of historically-received business instructions.

The server predicts an expected business operation that the user may perform subsequently based on historically-received business instructions. The server saves an operation record of the user, and predicts, based on the operation record of the user, a possible business operation that is likely to be performed by the user in a next step and an expected account to be operated. After receiving the business instruction transmitted by the client, the server calculates, based on an operation habit of the user, an expected value that each business operation is the expected business operation to be performed by the user in the next step. A probability that a business operation is to be performed by the user in the next step increases as the expected value corresponding to the business operation increases. The expected value corresponding to each business operation may be related to current time when the server receives the business instruction and a business operation habit of the user. Due to differences in operation habits of users, the historically-received business instructions can be business instructions received by the server and carrying the same identification identifier, or business instructions received by the server showing similar operation habits of the user and carrying different identification identifiers.

At step 802, the server determines whether the at least one expected business operation includes a target expected business operation having an expected value greater than a threshold.

An expected threshold is set. When the expected value of the predicted expected business operation is greater than the expected threshold, it means that the user is likely to perform the expected business operation in the next step. An expected business operation with a greatest expected value that is greater than the set threshold can be as the target expected business operation, to indicate that the user is likely to perform the target expected business operation in the next step, or all expected business operations having the expected value greater than the set threshold can be determined as the target expected business operations, to indicate that the user is likely to perform these target expected business operations in the next step. The expected business operation having the expected value smaller than the set threshold is unlikely to be the business operation that the user may perform in the next step. In a case that the at least one expected business operation includes no target expected business operation having an expected value greater than the threshold, the server cannot predict a next operation that the user may perform, and thus it is impossible to determine the target expected business operation.

At step 803, the server pushes to the client an expected account identifier corresponding to the target expected business operation and an attribute of an account corresponding to the expected account identifier, when the at least one expected business operation includes the target expected business operation having the expected value greater than the threshold.

In a case where there is the target expected business operation having the expected value greater than the threshold, the expected account identifier corresponding to the target expected business operation is determined, and the expected account identifier is an account identifier of an account on which the server may perform the target expected business operation. The server pushes to the client the expected account identifier corresponding to the target expected business operation and the attribute of the account corresponding to the expected account identifier.

In the embodiments of the present disclosure, the pushing of the account identifier and the account attribute of an expected account that the user may operate to the user based on a historical operation record of the user reduces time for the user to query the expected account, promotes the management efficiency of accounts, and improves the user experience.

In a possible implementation, the predicting, by the server, the at least one expected business operation based on the set of historically-received business instructions includes: inputting, by the server, a business instruction parameter in the set of historically-received business instructions into a trained neural network prediction model to obtain at least one expected business operation and an expected value corresponding to the at least one expected business operation, in which the business instruction parameter includes a type of the business instruction, reception time of the business instruction, and context information of the business instruction.

In the embodiments of the present disclosure, a neural network prediction model can be used to predict at least one expected business operation. The neural network prediction model can be a Back Propagation (BP) neural network model, a convolutional neural network model, a recurrent neural network model, a deep neural network model, and the like. The neural network prediction model can be trained in a supervised manner by using a large number of supervised training samples for training.

When the neural network prediction model is used to predict the at least one expected business operation, the neural network model needs to be trained first. Training samples can include business instruction parameters of respective business instructions in the set of historically-received business instructions of the server. The training samples are input into the neural network prediction model for training, thereby obtaining a predicted result of the expected business. Whether the model is a trained model is determined based on a number of training samples and the accuracy of the predicted result.

Here, the business instruction parameters in the set of historically-received business instructions of the server include a type of a historically-received business instruction of the server, reception time of the business instruction, context information of the business instruction, and the like. The context information of the business instruction may include a relation between a currently-received business instruction and a business instruction immediately previous to the currently-received business instruction or business instructions immediately previous to the currently-received business instruction and a relation between the currently-received business instruction and a business instruction immediately next to the currently-received business instruction or business instructions immediately next to the currently-received business instruction, e.g., whether two business instructions have an inevitable sequence relation, are repeated business instructions, and the like. During training of the neural network prediction model, the set of historically-received business instructions of the server is divided into a training set and a test set. A ratio of the training set to the test set can be 8:2 or 9:1. To ensure the accuracy of the trained neural network prediction model, a sample size of the training set should be greater than a number threshold (for example, 100,000). The business instruction parameters, e.g., the type of the business instruction, the reception time of the business instruction, and the context information of the business instruction, in the training set are used as inputs of the neural network prediction model to train the neural network prediction model. After the training is completed, the test set is used to test performance of the trained neural network prediction model. If the accuracy of the neural network prediction model reaches an accuracy threshold, such as 80%, the training of the neural network prediction model is completed. If the accuracy of the neural network prediction model does not reach the accuracy threshold, the parameters need to be modified to re-train the model until the accuracy of the neural network prediction model reaches the accuracy threshold, or the sample size of the training set can be increased to improve the accuracy of the neural network prediction model. After the training is completed, when the server receives the business instruction transmitted by the client, the trained neural network prediction model is used to predict the at least one expected business operation, thereby obtaining the at least one expected business operation and the expected value corresponding to the at least one expected business operation.

Since users have different operation habits, each identification corresponds to one neural network prediction model. After obtaining the predicted expected business operation and the expected value corresponding to the expected business operation, the server waits for the client to transmit a next business instruction. After receiving the next business instruction transmitted by the client, the server compares the next business instruction with the predicted expected business operation, modifies parameters of the neural network prediction model when the prediction is inaccurate, and adds a current business instruction to the set of historically-received business instructions of the server as the training set. That is, the type of the current business instruction, the reception time of the current business instruction, and the context information of the current business instruction are used as training data to re-train the neural network prediction model, such that the neural network prediction model may have higher accuracy.

In the embodiments of the present disclosure, the server uses the set of historically-received business instructions to train the neural network prediction model, and uses the trained neural network prediction model to predict at least one expected business operation, thereby predicting the expected business that the user may perform in the next step more accurately.

Figure 9:
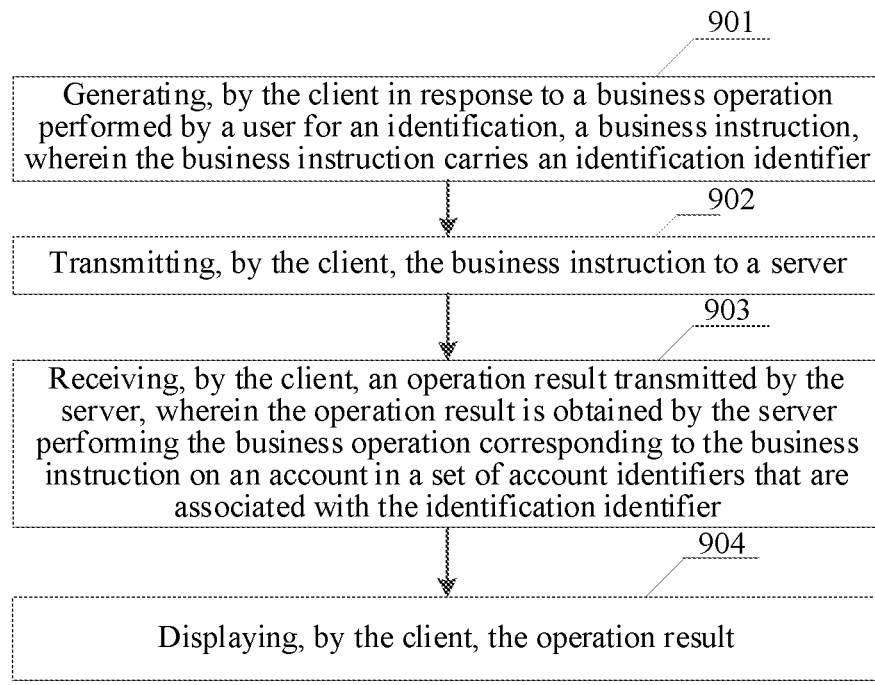
FIG. 9 is a schematic flowchart showing yet another account management method according to an embodiment of the present disclosure.

FIG. 9 is a schematic flowchart showing yet another account management method according to an embodiment of the present disclosure. As illustrated in FIG. 9, the account management method is applied in the client, and includes the following steps.

At step 901, the client generates, in response to a business operation performed by a user for an identification, a business instruction.

The client has a display interface for displaying relevant information of the identification registered by a user to the user. The user can perform business operations on the identification on the display interface of the client. The client generates, in response to the business operation performed by the user for the identification, the business instruction, in which the business instruction carries the identification identifier of the identification on which the user performs the business operation.

At step 902, the client transmits the business instruction to a server.

The client transmits the generated business instruction to the server, such that the server can determine the set of account identifiers associated with the identification identifier based on the identification identifier carried in the business instruction, and perform the business operation corresponding to the business instruction on the accounts in the set of account identifiers.

At step 903, the client receives an operation result transmitted by the server.

The operation result is obtained by the server performing the business operation corresponding to the business instruction on an account in a set of account identifiers that are associated with the identification identifier. The operation result is related to the business instruction, and corresponds to the business operation performed by the user on the identification on the display interface of the client.

At step 904, the client displays the operation result.

The client displays the obtained operation result on the display interface, and the obtained operation result can be displayed by the client in a form of a text box or a table.

In the embodiments of the present disclosure, since multiple accounts of the user are associated with one securities account, the user only needs to log in to one identification to manage the multiple accounts, such that operations are convenient, and operation time is shortened, thereby improving the management efficiency of the multiple accounts.

In a possible implementation, the business operation includes an intra-identification transfer operation, and the generating, by the client in response to the business operation performed by the user for the identification, the business instruction includes: responding, by the client, an intra-identification transfer request from the user for the identification; and receiving, by the client, a payment account identifier, a recipient account identifier, and a transfer amount that are selected by the user to generate a transfer instruction, in which the transfer instruction carries the identification identifier, the payment account identifier, the recipient account identifier, and the transfer amount, and the payment account identifier and the recipient account identifier are any two different account identifiers in the set of account identifiers.

The client responds to the intra-identification transfer request for the identification. The recipient account and the payment account that are available to the transfer operation are displayed on the display interface of the client for the user to select, and the recipient account and the payment account selected by the user are received to determine a transfer-out business account and a transfer-in business account. The payment account identifier and the recipient account identifier are any two different account identifiers in the set of account identifiers. The client receives the transfer amount input by the user, or the transfer amount recommended by the client to the user and selected by the user from the display interface. After selecting the payment account, the recipient account, and the transfer amount, the user clicks a transfer confirmation button. The client generates, in response to an operation of transfer confirmation of the user, the transfer instruction. The transfer instruction carries the payment account identifier, the recipient account identifier, and the transfer amount, such that the server can perform the corresponding transfer operation based on the business instruction.

In the embodiments of the present disclosure, when the business operation includes the intra-identification transfer operation, the business instruction generated by the client carries the payment account identifier, the recipient account identifier, and the transfer amount, such that the server can perform the transfer operation corresponding to the business instruction.

In a possible implementation, the business operation includes a query operation, and the account management method includes: generating, by the client in response to a query request from the user for the identification, a query instruction, in which the query instruction carries a screening condition and the identification identifier of the identification; transmitting, by the client, the query instruction to the server; receiving, by the client, a query result returned by the server, in which the query result includes a target account identifier that meets the screening condition in the set of account identifiers and information of an account corresponding to the target account identifier; and displaying, by the client, the target account identifier and information of a target account corresponding to the target account identifier.

After the user logs in to the identification, the client transmits a login instruction to the server, and the server obtains information of the identification that the user logs in and the set of account identifiers of the accounts associated with the identification. The server returns the obtained information of the identification and the set of account identifiers of the accounts associated with the identification to the client, and the client displays the information of the identification and the set of account identifiers of the accounts associated with the identification to the user. The user can perform the query operation on the accounts in the set of account identifiers that are displayed on the display interface of the client. When performing the query operation, the user queries information of all accounts associated with the logged-in identification, or queries only information of a certain account or information of an account that meets a specific condition.

When the user queries the information of all accounts associated with the currently logged-in identification, the query instruction generated by the client carries the identification identifier of the currently logged-in identification and the screening condition, in which the screening condition is the set of account identifiers associated with the carried identification identifier. When the query operation of the user is only for the certain account, the screening condition carried in the query instruction is the account identifier of the certain account that the user wants to query. When the user queries the information of the account that meets the specific condition, the screening condition carried in the query instruction is the specific condition. For example, when the user wants to query information of the Hong Kong stock margin account associated with the currently logged-in identification, screening conditions carried in the query instruction that is generated by the client are that the business type is "stocks", the currency type is "Hong Kong dollars", and the fund type is "margin".

The client transmits the generated query instruction to the server. The server determines, based on the identification identifier carried in the query instruction and the screening condition, the target account identifier that meets the screening condition from the set of account identifiers associated with the identification identifier, obtains the information of the target account corresponding to the target account identifier, and returns the target account identifier and the information of the target account corresponding to the target account identifier to the client. The client receives the query result returned by the server, i.e., the target account identifier and the information of the target account corresponding to the target account identifier that are returned by the server, and displays the target account identifier and the information of the target account corresponding to the target account identifier.

In the embodiments of the present disclosure, the client generates, in response to the query operation of the user, the query instruction, and transmits the business instruction carrying the identification identifier and the screening condition to the client. The client performs the query operation to obtain the query result and returns the query result to the client. The client receives the query result transmitted by the server and displays the query result. That is, the client displays the target account identifier that meets the screening condition and the information of the target account corresponding to the target account identifier. An account identifier and information of an account that meets requirements of the user are displayed, which improves the user experience.

In a possible implementation, the account management method further includes, prior to the generating, by the client in response to the business operation performed by the user for the identification, the business instruction: determining, by the client, whether the set of account identifiers includes at least one non-empty account; determining, by the client, a corresponding opening place based on current time, and determining, by the client, a displayable account that supports the opening place in the at least one non-empty account, when the set of account identifiers includes the at least one non-empty account; and displaying, by the client, the displayable account.

The non-empty account refers to an account whose account balance is not zero. The opening place refers to a tradable trading market at current time. The trading market includes the stock market, bond market, fund market, derivatives market, etc., in which the stock market can include China's Shanghai and Shenzhen stock markets, China's Hong Kong stock market, the US stock market, the European stock market, and the like. Different markets have different trading hours. For example, China's Shanghai and Shenzhen stock markets open from 9:30 a.m. to 11:30 a.m. and from 1:00 p.m. to 3:00 p.m. on Monday through Friday, trading hours of China's Hong Kong stock market are 9:30 a.m. to 12:00 a.m. and 1:00 p.m. to 4:00 p.m. on Monday through Friday, the US stock market opens at 21:30 p.m. and closes at 4:00 a.m. in the summer, and opens at 22:30 p.m. and closes at 5:00 a.m. in the winter, and trading hours of the European stock market are 15:00 p.m. to 23:30 p.m. in the summer and 16:00 p.m. to 0:30 a.m. in the winter. Assuming that the current time is 10:00 a.m., the opening place includes China's Shanghai and Shenzhen stock markets and China's Hong Kong stock market. The client determines whether the set of account identifiers associated with the identification identifier includes at least one non-empty account, and selects an account identifier of an account whose account balance is not zero from the set of account identifiers. Based on the current time, the client determines a displayable account that supports the opening place from the account whose balance is not zero, i.e., the client determines a current tradable account. The client displays the displayable account.

Optionally, when the displayable accounts include more than one account, the client may display the displayable accounts based on historical operation records of the user. The client obtains historical operation records of accounts in the displayable accounts, determines, based on the historical operation records, an account operated by the user most recently, and preferentially displays the determined account operated by the user most recently.

Optionally, when the displayable accounts include more than one account, the client may determine a frequently-used account of the user based on operation frequencies of accounts in the displayable accounts, and displays the frequently-used account in the displayable accounts before a non-frequently-used account in the displayable accounts. A display sequence of the displayable accounts can also be determined in combination with transferable amounts of the accounts in the displayable accounts and user operation frequencies of the accounts. The client gives priority to displaying an account in the displayable accounts that has a large transferable amount and a high user operation frequency.

In the embodiments of the present disclosure, the client displays a tradable account whose balance is not zero at current time, such that the user does not need to manually search for tradable accounts when conducting a transaction, which saves the operation time for the user and improves the user experience.

Figure 10:
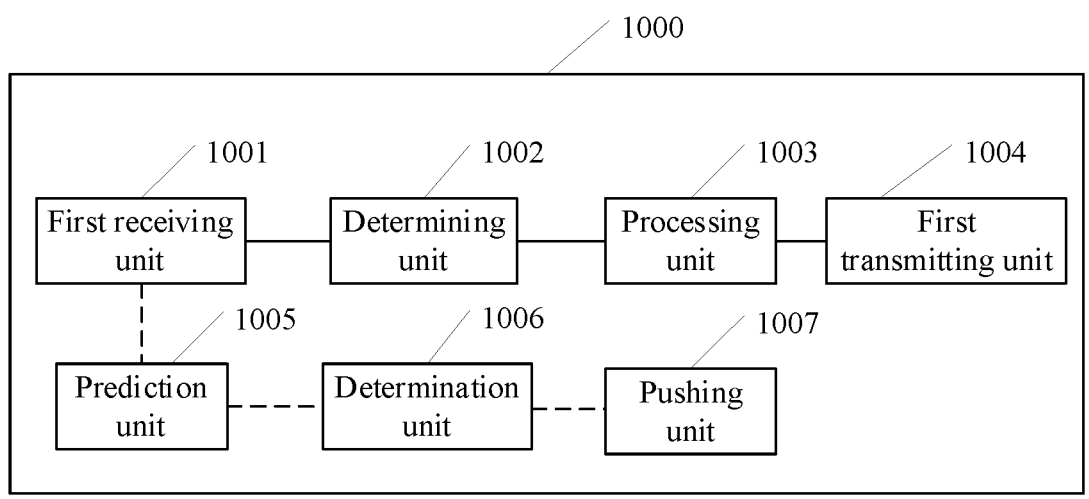
FIG. 10 is a schematic diagram showing a structure of an account management apparatus according to an embodiment of the present disclosure.

FIG. 10 is a schematic diagram showing a structure of an account management apparatus according to an embodiment of the present disclosure. As illustrated in FIG. 10, an account management apparatus 1000 includes a first receiving unit 1001, a determining unit 1002, a processing unit 1003, and a first transmitting unit 1004.

The first receiving unit 1001 is configured to receive a business instruction transmitted by a client, in which the business instruction carries an identification identifier.

The determining unit 1002 is configured to determine a set of account identifiers associated with the identification identifier based on an identification and account association table, in which the set of account identifiers includes at least two different account identifiers.

The processing unit 1003 is configured to perform a business operation corresponding to the business instruction on accounts in the set of account identifiers to obtain a business operation result.

The first transmitting unit 1004 is configured to return the business operation result to the client.

Optionally, the account management apparatus 1000 further includes a prediction unit configured to predict at least one expected business operation based on a set of historically-received business instructions.

Optionally, the account management apparatus 1000 further includes a determination unit 1006 configured to determine whether the at least one expected business operation includes a target expected business operation having an expected value greater than a threshold.

Optionally, the account management apparatus 1000 further includes a pushing unit 1007 configured to push, to the client, an expected account identifier corresponding to the target expected business operation and an attribute of an account corresponding to the expected account identifier, when the at least one expected business operation includes the target expected business operation having the expected value greater than the threshold.

Regarding the apparatus in the above embodiments, a specific manner in which each unit performs operations has been described in detail in the method embodiments, and detailed description will be omitted here.

In the embodiments of the present disclosure, since multiple accounts of the user are associated with one securities identification, operations can be performed on the multiple accounts without logging in to each account separately, such that operations are convenient, and operation time is shortened, thereby improving management efficiency of the multiple accounts.

Figure 11:
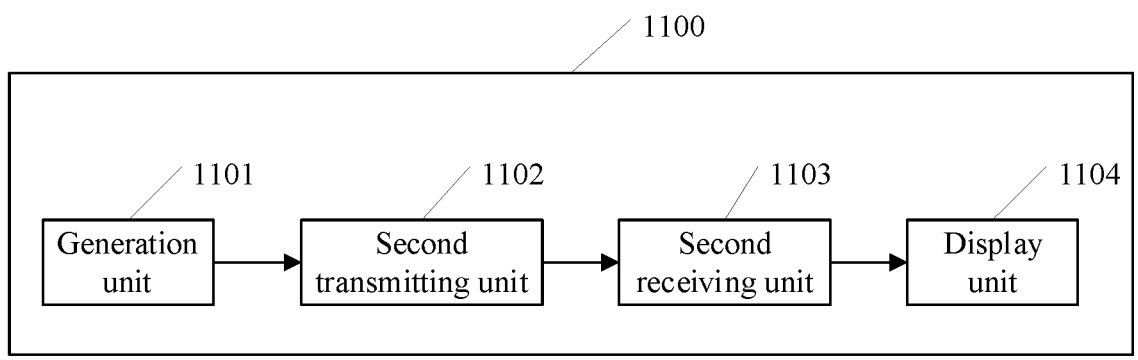
FIG. 11 is a schematic diagram showing a structure of another account management apparatus according to an embodiment of the present disclosure.

FIG. 11 is a schematic diagram showing a structure of another account management apparatus according to an embodiment of the present disclosure. As illustrated in FIG. 11, an account management apparatus 1100 includes a generation unit 1101, a second transmitting unit 1102, a second receiving unit 1103, and a display unit 1104.

The generation unit 1101 is configured to generate, in response to a business operation performed by a user for an identification, a business instruction, in which the business operation carries an identification identifier.

The second transmitting unit 1102 is configured to transmit the business instruction to a server.

The second receiving unit 1103 is configured to receive an operation result transmitted by the server, in which the operation result is obtained by the server performing the business operation corresponding to the business instruction on an account in a set of account identifiers that are associated with the identification identifier.

The display unit 1104 is configured to display the operation result.

Regarding the apparatus in the above embodiments, a specific manner in which each unit performs operations has been described in detail in the method embodiments, and detailed description will be omitted here.

In the embodiments of the present disclosure, since multiple accounts of the user are associated with one securities identification, operations can be performed on the multiple accounts without logging in to each account separately, such that operations are convenient, and operation time is shortened, thereby improving management efficiency of the multiple accounts.

Figure 12:
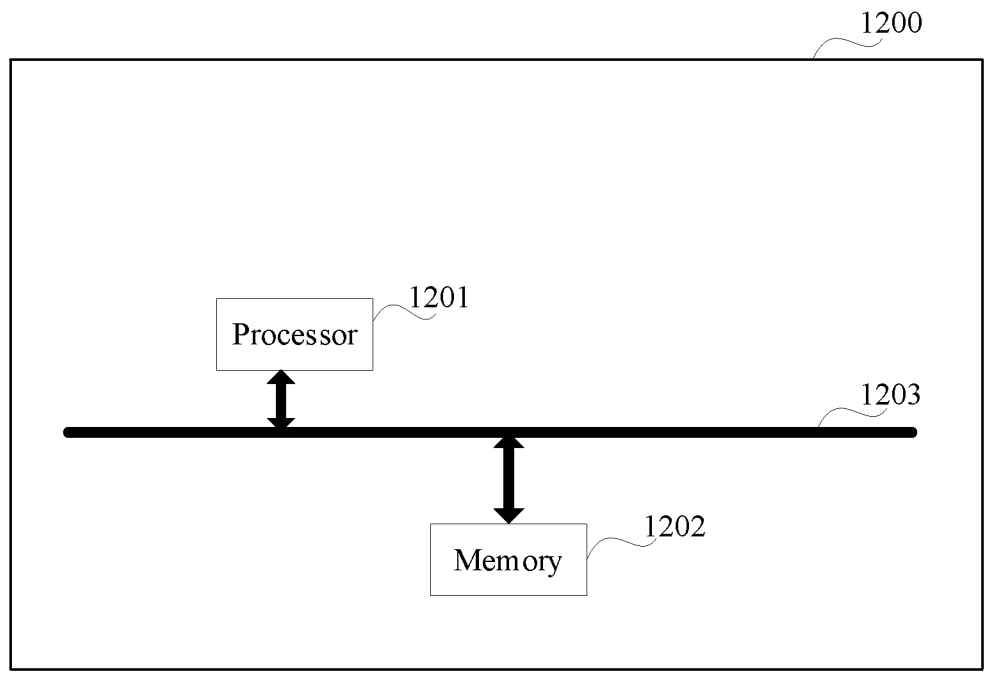
FIG. 12 is a schematic diagram showing a structure of a terminal device according to an embodiment of the present disclosure.

FIG. 12 is a schematic diagram showing a structure of a terminal device according to an embodiment of the present disclosure. As illustrated in FIG. 12, a server 1200 includes a processor 1201 and a memory 1202. The processor 1201 and the memory 1202 may be connected to each other via a communication bus 1203. The communication bus 1203 may be a Peripheral Component Interconnect (PCI) bus, an Extended Industry Standard Architecture (EISA) bus, and the like. The communication bus 1203 can be divided into an address bus, a data bus, a control bus, and the like. For the sake of description, only one thick line is drawn in FIG. 12 to represent the communication bus 1203, but it does not mean that there is only one bus or one type of bus. The memory 1202 stores computer programs including program instructions. The processor 1201 is configured to call the program instructions to perform part or all of the steps in the method illustrated in FIG. 6 to FIG. 8.

The processor 1201 may be a general-purpose Central Processing Unit (CPU), a microprocessor, an Application-Specific Integrated Circuit (ASIC), or one or more integrated circuits for controlling an execution of programs in the above solutions.

The memory 1202 may be, but is not limited to, a Read-Only Memory (ROM) or other types of static storage devices that can store static information and instructions, a Random Access Memory (RAM) or other types of dynamic storage devices that can store information and instructions, an Electrically Erasable Programmable Read-Only Memory (EEPROM), a Compact Disc Read-Only Memory (CD-ROM) or other optical disc storages, an optical disc storage (including a compact disc, a laser disc, an optical disc, a digital universal disc, a Blu-ray disc, etc.), a magnetic disk storage medium or other magnetic storage devices, or any other medium that can be used to carry or store desired program codes in the form of instructions or data and that can be accessed by a computer. The memory can exist alone and be connected to the processor via a bus. The memory can also be integrated with the processor.

In addition, the terminal device 1200 may further include general components such as a communication interface and an antenna, and details thereof will be omitted here.

Figure 13:
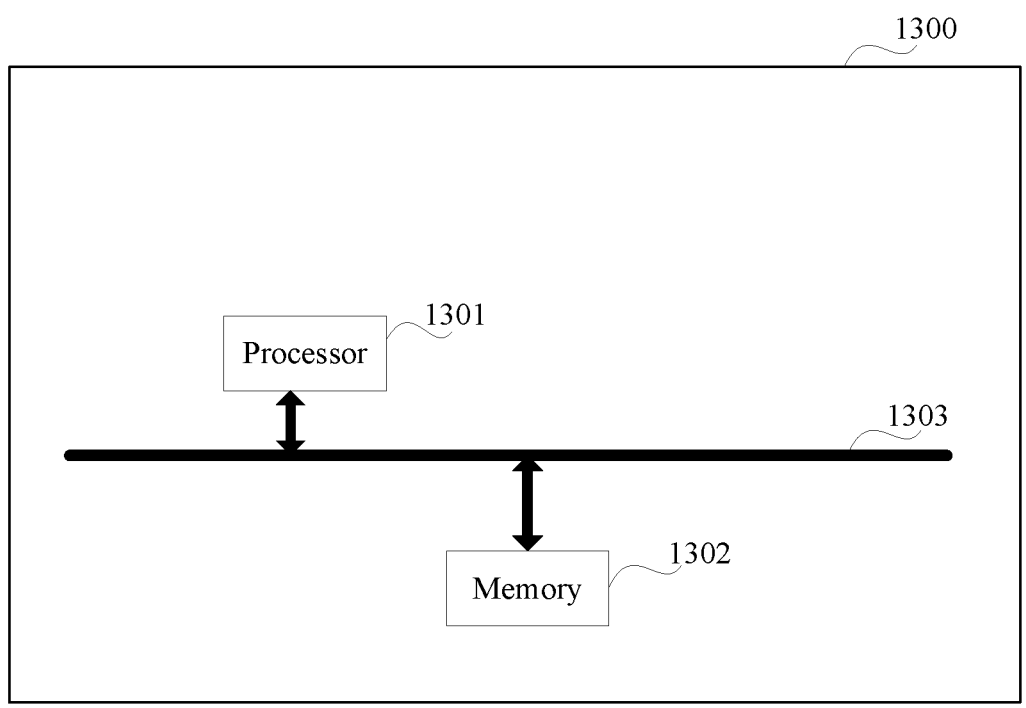
FIG. 13 is a schematic diagram showing a structure of a terminal device according to an embodiment of the present disclosure.

FIG. 13 is a schematic diagram showing a structure of a terminal device according to an embodiment of the present disclosure. As illustrated in FIG. 13, a terminal device 1300 includes a processor 1301 and a memory 1302. The processor 1301 and the memory 1302 may be connected to each other via a communication bus 1303. The communication bus 1303 may be a Peripheral Component Interconnect (PCI) bus or an Extended Industry Standard Architecture (EISA) bus, and the like. The communication bus 1303 can be divided into an address bus, a data bus, a control bus, and the like. For the sake of description, only one thick line is drawn in FIG. 13 to represent the communication bus 1303, but it does not mean that there is only one bus or one type of bus. The memory 1302 stores computer programs including program instructions. The processor 1301 is configured to call the program instructions to perform part or all of the steps in the method illustrated in FIG. 9.

The processor 1301 may be a general-purpose Central Processing Unit (CPU), a microprocessor, an Application-Specific Integrated Circuit (ASIC), or one or more integrated circuits for controlling an execution of programs in the above solutions.

The memory 1302 may be, but is not limited to, a Read-Only Memory (ROM) or other types of static storage devices that can store static information and instructions, a Random Access Memory (RAM) or other types of dynamic storage devices that can store information and instructions, an Electrically Erasable Programmable Read-Only Memory (EEPROM), a Compact Disc Read-Only Memory (CD-ROM) or other optical disc storages, an optical disc storage (including a compact disc, a laser disc, an optical disc, a digital universal disc, a Blu-ray disc, etc.), a magnetic disk storage medium or other magnetic storage devices, or any other medium that can be used to carry or store desired program codes in the form of instructions or data and that can be accessed by a computer. The memory can exist alone and be connected to the processor via a bus. The memory can also be integrated with the processor.

In addition, the terminal device 1300 may further include general components such as a communication interface and an antenna, and details thereof will be omitted here.

The embodiments of the present disclosure further provide a computer-readable storage medium. Here, the computer-readable storage medium stores a computer program for electronic data exchange, and the computer program enables a computer to perform part or all of the procedures of the account management method according to any of the method embodiments illustrated in FIG. 6 to FIG. 8.

The embodiments of the present disclosure further provide a computer-readable storage medium. Here, the computer-readable storage medium stores a computer program for electronic data exchange, and the computer program enables a computer to perform part or all of the procedures of the account management method according to any of the method embodiments illustrated in FIG. 9.

It should be understood that applications of the present disclosure are not limited to the above examples. On a basis of the above description, improvements or variants can be made by those skilled in the art without departing from the protection scope of the claims as attached.

What is claimed is:

1. A user operation responding method, applied in a server, the server having an account association table stored therein, the account association table recording, for each identification identifier, a plurality of account identifiers associated with the identification identifier, each identification identifier and its associated plurality of account identifiers belonging to a same user, the method comprising:

receiving, by the server, a business instruction transmitted by a client and generated in response to an operation performed by a user for an identification, wherein the business instruction carries an identification identifier of the identification, and the identification identifier is used to confirm an identity of the user and determine an identification on which the user performs a business operation, and is associated with a plurality of account identifiers;

searching, by the server, the account association table for a set of account identifiers associated with the identification identifier based on the identification identifier, wherein the set of account identifiers comprises at least two different account identifiers, and the identification identifier and the at least two different account identifiers belong to the user;

determining from the set of account identifiers, by the server based on information carried in the business instruction, an account that requires the business operation, and performing, by the server, a business operation corresponding to the business instruction on the account that requires the business operation in the set of account identifiers to obtain a business operation result, wherein funds are allowed to be directly transferred between accounts in the set of account identifiers belonging to the user, and online time and points between the accounts in the set of account identifiers belonging to the user are accumulated and allowed to be shared synchronously;

returning, by the server, the business operation result to the client;

predicting, by the server, at least one expected business operation corresponding to a next business instruction based on a set of historically-received business instructions and a trained neural network prediction model by inputting the business instruction into the trained neural network prediction model;

determining, by the server, whether the at least one expected business operation corresponding to the next business instruction comprises a target expected business operation having an expected value greater than a threshold;

determining and pushing, by the server to the client, an expected account identifier corresponding to the target expected business operation and an attribute of an account corresponding to the expected account identifier, when the at least one expected business operation comprises the target expected business operation having the expected value greater than the threshold; and comparing, by the server after receiving the next business instruction transmitted by the client, the next business instruction with a predicted expected business operation, modifying, by the server, a parameter of the neural network prediction model when the predicted expected business operation is inaccurate, and adding, by the server, a current business instruction to the set of historically-received business instructions of the server as a training set to re-train the neural network prediction model, wherein a type of the business instruction comprises a type of intra-identification transfer, the business instruction further carries a payment account identifier, a recipient account identifier, and a transfer amount, and the payment account identifier and the recipient account identifier are any two different account identifiers in the set of account identifiers; and said performing, by the server, the business operation corresponding to the business instruction on the account in the set of account identifiers to obtain the business operation result comprises:

determining, by the server, whether a transferable amount of a payment account corresponding to the payment account identifier is smaller than the transfer amount;

performing, by the server, a transfer operation to obtain transfer completion information, when the transferable amount is equal to or greater than the transfer amount; and obtaining, by the server, transfer failure information, when the transferable amount is smaller than the transfer amount.

2. The user operation responding method according to claim 1, wherein a type of the business instruction comprises a query type, and the business instruction further carries a screening condition; and said performing, by the server, the business operation corresponding to the business instruction on the account in the set of account identifiers to obtain the business operation result comprises:

determining, by the server, a target account identifier that meets the screening condition from the set of account identifiers.

3. The user operation responding method according to claim 2, wherein the screening condition comprises a target business type, a target currency, and a target fund type; and said determining, by the server, the target account identifier that meets the screening condition from the set of account identifiers comprises:

determining, by the server, the target account identifier that supports the target business type, the target currency, and the target fund type from the set of account identifiers.

4. The user operation responding method according to claim 2, wherein the business operation result comprises the target account identifier and an attribute of an account corresponding to the target account identifier.

5. The user operation responding method according to claim 1, wherein said predicting, by the server, the at least one expected business operation corresponding to a next business instruction based on the set of historically-received business instructions and the trained neural network prediction model comprises:

inputting, by the server, a business instruction parameter in the set of historically-received business instructions into the trained neural network prediction model to obtain at least one expected business operation and an expected value corresponding to the at least one expected business operation, wherein the business instruction parameter comprises a type of the business instruction, reception time of the business instruction, and context information of the business instruction.

6. A computer-readable storage medium having a computer program stored thereon, wherein the computer program comprises program instructions, and the program instructions, when executed by a processor, cause the processor to perform the method according to claim 1.

7. A user operation responding method, applied in a client, the method comprising:

generating, by the client in response to a business operation performed by a user for an identification, a business instruction, wherein the business instruction carries an identification identifier of the identification, and the identification identifier is used to confirm an identity of the user and determine the identification on which the user performs the business operation, and is associated with a plurality of account identifiers, the identification identifier and the plurality of account identifiers belonging to the user;

transmitting, by the client, the business instruction to a server, the server having an account association table stored therein, the account association table recording, for each identification identifier, a plurality of account identifiers associated with the identification identifier, each identification identifier and its associated plurality of account identifiers belonging to a same user;

receiving, by the client, an operation result transmitted by the server, wherein the operation result is obtained by the server determining from a set of account identifiers, based on information carried in the business instruction, an account that requires the business operation and performing a business operation corresponding to the business instruction on the account that requires the business operation in the set of account identifiers that are associated with the identification identifier, wherein funds are allowed to be directly transferred between accounts in the set of account identifiers belonging to the user, and online time and points between the accounts in the set of account identifiers belonging to the user are accumulated and allowed to be shared synchronously;

displaying, by the client, the operation result;

receiving, by the client, an expected account identifier corresponding to a target expected business operation and an attribute of an account corresponding to the expected account identifier, wherein the target expected business operation is obtained by the server predicting, based on a set of historically-received business instructions and a trained neural network prediction model, at least one expected business operation corresponding to a next business instruction by inputting the business instruction into the trained neural network prediction model and determining whether the at least one expected business operation corresponding to the next business instruction comprises a target expected business operation having an expected value greater than a threshold;

displaying, by the client, the expected account identifier and the attribute of the account corresponding to the expected account identifier;

generating, by the client in response to a next business operation performed by the user for the identification, the next business instruction; and transmitting, by the client, the next business instruction to the server for enabling the server to compare the next business instruction with a predicted expected business operation, modify a parameter of the neural network prediction model when the predicted expected business operation is inaccurate, and add a current business instruction to the set of historically-received business instructions of the server as a training set to re-train the neural network prediction model, wherein a type of the business instruction comprises a type of intra-identification transfer, the business instruction further carries a payment account identifier, a recipient account identifier, and a transfer amount, and the payment account identifier and the recipient account identifier are any two different account identifiers in the set of account identifiers; and said performing the business operation corresponding to the business instruction on the account that requires the business operation in the set of account identifiers that are associated with the identification identifier comprises:

determining, by the server, whether a transferable amount of a payment account corresponding to the payment account identifier is smaller than the transfer amount;

performing, by the server, a transfer operation to obtain transfer completion information, when the transferable amount is equal to or greater than the transfer amount; and obtaining, by the server, transfer failure information, when the transferable amount is smaller than the transfer amount.

8. The user operation responding method according to claim 7, wherein the business operation comprises an intra-identification transfer operation, and said generating, by the client in response to the business operation performed by the user for the identification, the business instruction comprises:

responding, by the client, to an intra-identification transfer request from the user for the identification; and receiving, by the client, a payment account identifier, a recipient account identifier, and a transfer amount that are selected by the user to generate a transfer instruction, wherein the transfer instruction carries the identification identifier, the payment account identifier, the recipient account identifier, and the transfer amount, and the payment account identifier and the recipient account identifier are any two different account identifiers in the set of account identifiers.

9. The user operation responding method according to claim 7, wherein the business operation comprises a query operation, and the method further comprises:

generating, by the client in response to a query request from the user for the identification, a query instruction, wherein the query instruction carries a screening condition and the identification identifier of the identification;

transmitting, by the client, the query instruction to the server;

receiving, by the client, a query result returned by the server, wherein the query result comprises a target account identifier that meets the screening condition in the set of account identifiers and information of the target account corresponding to the target account identifier; and displaying, by the client, the target account identifier and information of the target account corresponding to the target account identifier.

10. The user operation responding method according to claim 7, further comprising, prior to said generating, by the client in response to the business operation performed by the user for the identification, the business instruction:

determining, by the client, whether the set of account identifiers comprises at least one non-empty account;

when the set of account identifiers comprises the at least one non-empty account, determining, by the client, a corresponding opening place based on current time, and determining, by the client, a displayable account that supports the opening place in the at least one non-empty account; and displaying, by the client, the displayable account.

11. A terminal device, comprising a processor and a memory, wherein the memory has one or more programs stored thereon, and the one or more programs are configured to be executed by the processor to perform the method according to claim 7.

12. The terminal device according to claim 11, wherein the business operation comprises an intra-identification transfer operation, and said generating, by the client in response to the business operation performed by the user for the identification, the business instruction comprises:

responding, by the client, to an intra-identification transfer request from the user for the identification; and receiving, by the client, a payment account identifier, a recipient account identifier, and a transfer amount that are selected by the user to generate a transfer instruction, wherein the transfer instruction carries the identification identifier, the payment account identifier, the recipient account identifier, and the transfer amount, and the payment account identifier and the recipient account identifier are any two different account identifiers in the set of account identifiers.

13. The terminal device according to claim 11, wherein the business operation comprises a query operation, and the method further comprises:

generating, by the client in response to a query request from the user for the identification, a query instruction, wherein the query instruction carries a screening condition and the identification identifier of the identification;

transmitting, by the client, the query instruction to the server;

receiving, by the client, a query result returned by the server, wherein the query result comprises a target account identifier that meets the screening condition in the set of account identifiers and information of the target account corresponding to the target account identifier; and displaying, by the client, the target account identifier and information of the target account corresponding to the target account identifier.

14. A computer-readable storage medium, having a computer program stored thereon, wherein the computer program comprises program instructions, and the program instructions, when executed by a processor, cause the processor to perform the method according to claim 7.

15. A server, comprising a processor and a memory, wherein the memory has one or more programs stored thereon, and the one or more programs are configured to be executed by the processor to perform a user operation responding method, the server having an account association table stored therein, the account association table recording, for each identification identifier, a plurality of account identifiers associated with the identification identifier, each identification identifier and its associated plurality of account identifiers belonging to a same user, the server comprising:

receiving, by the server, a business instruction transmitted by a client and generated in response to an operation performed by a user for an identification, wherein the business instruction carries an identification identifier of the identification, and the identification identifier is used to confirm an identity of the user and determine an identification on which the user performs a business operation, and is associated with a plurality of account identifiers;

searching, by the server, the account association table for a set of account identifiers associated with the identification identifier based on the identification identifier, wherein the set of account identifiers comprises at least two different account identifiers, and the identification identifier and the at least two different account identifiers belong to the user;

determining from the set of account identifiers, by the server based on information carried in the business instruction, an account that requires the business operation, and performing, by the server, a business operation corresponding to the business instruction on the account that requires the business operation in the set of account identifiers to obtain a business operation result, wherein funds are allowed to be directly transferred between accounts in the set of account identifiers belonging to the user, and online time and points between the accounts in the set of account identifiers belonging to the user are accumulated and allowed to be shared synchronously;

returning, by the server, the business operation result to the client;

predicting, by the server, at least one expected business operation corresponding to a next business instruction based on a set of historically-received business instructions and a trained neural network prediction model by inputting the business instruction into the trained neural network prediction model;

determining, by the server, whether the at least one expected business operation corresponding to the next business instruction comprises a target expected business operation having an expected value greater than a threshold;

determining and pushing, by the server to the client, an expected account identifier corresponding to the target expected business operation and an attribute of an account corresponding to the expected account identifier, when the at least one expected business operation comprises the target expected business operation having the expected value greater than the threshold; and comparing, by the server after receiving the next business instruction transmitted by the client, the next business instruction with a predicted expected business operation, modifying, by the server, a parameter of the neural network prediction model when the predicted expected business operation is inaccurate, and adding, by the server, a current business instruction to the set of historically-received business instructions of the server as a training set to re-train the neural network prediction model, wherein a type of the business instruction comprises a type of intra-identification transfer, the business instruction further carries a payment account identifier, a recipient account identifier, and a transfer amount, and the payment account identifier and the recipient account identifier are any two different account identifiers in the set of account identifiers; and said performing, by the server, the business operation corresponding to the business instruction on the account in the set of account identifiers to obtain the business operation result comprises:

determining, by the server, whether a transferable amount of a payment account corresponding to the payment account identifier is smaller than the transfer amount;

performing, by the server, a transfer operation to obtain transfer completion information, when the transferable amount is equal to or greater than the transfer amount; and obtaining, by the server, transfer failure information, when the transferable amount is smaller than the transfer amount.

16. The server according to claim 15, wherein a type of the business instruction comprises a query type, and the business instruction further carries a screening condition; and said performing, by the server, the business operation corresponding to the business instruction on the account in the set of account identifiers to obtain the business operation result comprises:

determining, by the server, a target account identifier that meets the screening condition from the set of account identifiers.

17. The server according to claim 16, wherein the screening condition comprises a target business type, a target currency, and a target fund type; and said determining, by the server, the target account identifier that meets the screening condition from the set of account identifiers comprises:

determining, by the server, the target account identifier that supports the target business type, the target currency, and the target fund type from the set of account identifiers.

18. The server according to claim 16, wherein the business operation result comprises the target account identifier and an attribute of an account corresponding to the target account identifier.

* * * * *